Figure 1:
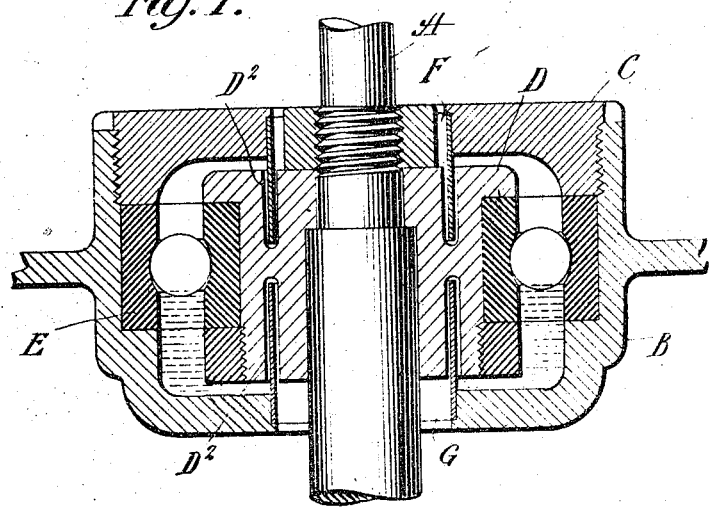

H. HESS.
LUBRICATING DEVICE FOR BEARINGS.
APPLICATION FILED FEB. 27, 1909.

1,140,375.   Patented May 25, 1915.

Witnesses:
Francis S. Ober
Waldo M. Chapin

Inventor:
HENRY HESS,
By his Attorneys

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

LUBRICATING DEVICE FOR BEARINGS.

1,140,375.     Specification of Letters Patent.     Patented May 25, 1915.

Application filed February 27, 1909. Serial No. 480,455.

*To all whom it may concern:*

Be it known that I, HENRY HESS, a citizen of the United States, residing at Wawa, in the county of Delaware and State of Pennsylvania, have invented certain new and useful Improvements in Lubricating Devices for Bearings, of which the following is a specification, reference being had therein to the accompanying drawing.

My invention relates to lubricating devices for bearings, and more particularly to the provision of parts which will permit the location of the bearing at any angle and in any desired position and at the same time will prevent the escape of the oil or other lubricant therefrom. Such bearings ordinarily comprise two relatively rotatable elements, one of which extends through and is partially located within the other, and in the absence of suitable preventing means, the oil or lubricant tends to escape at the points where one of the elements passes through the other.

Various forms of lubricating devices have been devised, whereby the lubricant is retained in proper relation to the bearing parts and its escape prevented, but ordinarily such devices necessitate the location of the bearing in a certain predetermined position, and undue tilting or inclination thereof defeats the purpose of the arrangement.

It is my intention to obviate the difficulty mentioned by providing one or other of the relatively rotatable elements with cylindrical projections or sleeves located at both sides thereof, to-wit, at the points where one element passes through the other, which projections or sleeves enter correspondingly shaped recesses in the other element.

More specifically, the form which I have illustrated in the drawing comprises a casing with a relatively rotatable shaft extending therethrough, and the cylindrical projections or sleeves are mounted at both sides of the casing and in parallelism to the shaft and enter correspondingly shaped recesses in a hub or boss mounted upon the the shaft. By this means and due to the relatively close fit of the sleeves in the recesses, and the tortuous path thus produced, the oil or other lubricant is satisfactorily retained and prevented from escaping, no matter in what angular position the parts may be mounted.

The drawing shows my invention in preferred forms, but obviously many changes and variations may be made therein without departing from its spirit, and I desire to be understood that the invention is not limited to any specific form or arrangement of parts, except in so far as such limitations are specified in the claims.

Referring to the drawing: Figure 1 is a transverse section of a lubricating device embodying my invention; and Fig. 2 is a similar view, illustrating a modified form thereof.

In Fig. 1, the shaft A is mounted in the usual manner in the casing, which in this instance consists of two members B and C connected together in any desired manner, as by screw-threads, so as to hold and retain the lubricating fluid, except at the points where the shaft A passes therethrough. The shaft A is provided with a boss or hub D, between which and the casing is located a ball bearing E. It will be understood, however, that I am not limited to this particular form of construction, as the invention would be equally applicable if the bearing were a plain one and the anti-friction elements dispensed with. In order to prevent the escape of the lubricant, I provide the casing with two cylindrical projections or sleeves F and G, which are connected respectively to the casing sections C and B, and which project inwardly into corresponding cylindrically shaped recesses $D^2$, $D^2$, formed in the hub D. The fit between the sleeves and the recesses is sufficiently close to prevent the passage of the oil or lubricant, although not so tight as to interfere with the normal rotation of the parts, this result being due in part to the tortuous path that would necessarily have to be followed by the lubricant, and also to the more or less viscid consistency of the latter. In the form shown I prefer to introduce sufficient oil into the casing to partially surround, or at any rate to contact with, the rolling elements of the ball bearing E, but obviously such amount will depend upon the character of the bearing, as well as upon the position in which it is mounted. As, because of the peculiar construction described, the escapement of the lubricant is prevented, it is obvious that the shaft and casing may be mounted in any desired angular position without the disadvantageous results previously described.

Figure 2:
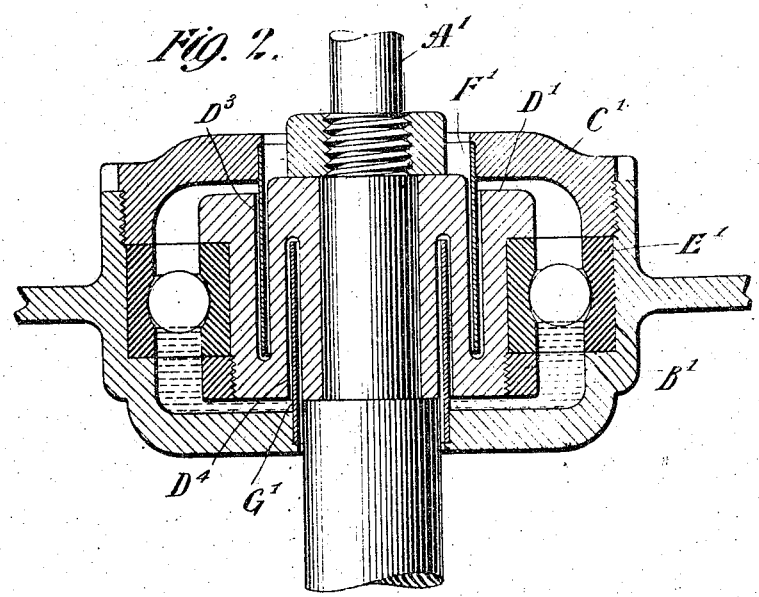

In Fig. 2, I have shown a modified form of construction, wherein the shaft $A^1$, casing members $B^1$ and $C^1$, boss $D^1$, and antifriction bearing $E^1$ are substantially the same as the similar parts already described. The main distinction is that the cylindrical extensions or sleeves $F^1$ and $G^1$ are not symmetrically located as in Fig. 1, the sleeve $F^1$ and and its corresponding recess $D^3$ being of greater diameter than the sleeve $G^1$ and its corresponding recess $D^4$, and both sleeves being relatively longer than the ones previously described, whereby it will be noted that they pass or overlap each other as distinguished from the arrangement shown in Fig. 1. The advantage derived from this modification is the fact that more metal may be employed in the boss $D^1$, and correspondingly greater strength and rigidity secured therefrom. It will be seen that in Fig. 1 the strength of the boss depends upon the limited amount of material left between the ends of the cylindrical recesses $D^2$, $D^2$; whereas, in Fig. 2, and due to the arrangement set forth, a considerably greater amount of strength and durability is secured. Evidently many similar variations will suggest themselves to those skilled in the art, and I do not limit myself to the exact embodiments of the invention shown, which I have illustrated only in preferred forms, as many equivalents are equally comprised within its scope.

Having thus described my invention, its construction and mode of operation, what I claim and desire to secure by Letters Patent of the United States, is as follows:

1. In a device of the type described, the combination of a surrounding casing, a rotatable member within the same, the outer side of said member and the inner side of said casing being spaced radially and axially from each other to form an annular oil space between them continuous from one side of the casing to the other, and through which the oil is adapted to freely flow in the reverse positions of the casing and member, an antifriction bearing comprising rolling members mounted in said continuous oil space midway or substantially so between its ends, cylindrical oil retaining projections on the casing extending inwardly from opposite ends on the same and fitting closely within circular recesses in the opposite ends of the rotatable member, the inner ends of said projections terminating respectively at such points relatively to the said rolling members and the normal oil level, that the latter will be retained at such height in either side of the oil chamber as to contact with said rolling members and lubricate them.

2. In a lubricating device, the combination of two relatively rotatable elements, one of said elements extending through a closed lubricating space in the other, and one of the elements being provided with cylindrical projections on both ends thereof which enter correspondingly shaped recesses in the other element to prevent the escape of the lubricant from the lubricating space, the inner adjacent ends of said cylindrical projections overlapping each other.

In testimony whereof I have affixed my signature in presence of two witnesses.

HENRY HESS.

Witnesses:
 THEO. H. M'CALLA,
 NETTIE L. HAHN.